United States Patent
Lim et al.

(10) Patent No.: US 9,645,288 B2
(45) Date of Patent: May 9, 2017

(54) FILM FOR DISPLAY DEVICE AND MANUFACTURING METHOD THEREOF

(71) Applicant: SAMSUNG DISPLAY CO., LTD., Yongin, Gyeonggi-Do (KR)

(72) Inventors: Jae Ik Lim, Hwaseong-si (KR); Won Sang Park, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 279 days.

(21) Appl. No.: 14/288,846

(22) Filed: May 28, 2014

(65) Prior Publication Data

US 2015/0043080 A1 Feb. 12, 2015

(30) Foreign Application Priority Data

Aug. 9, 2013 (KR) .................. 10-2013-0094906

(51) Int. Cl.
| | | |
|---|---|---|
| *G02B 5/02* | (2006.01) | |
| *B29C 59/02* | (2006.01) | |
| *B29L 9/00* | (2006.01) | |
| *B29L 11/00* | (2006.01) | |
| *B29L 31/34* | (2006.01) | |
| *B29K 33/04* | (2006.01) | |
| *B29K 33/00* | (2006.01) | |

(52) U.S. Cl.
CPC ............ *G02B 5/0242* (2013.01); *B29C 59/02* (2013.01); *G02B 5/0221* (2013.01); *G02B 5/0268* (2013.01); *B29K 2033/04* (2013.01); *B29K 2033/08* (2013.01); *B29K 2033/12* (2013.01); *B29L 2009/00* (2013.01); *B29L 2011/00* (2013.01); *B29L 2031/3475* (2013.01)

(58) Field of Classification Search
CPC . G02B 5/00; G02B 5/02; G02B 5/021; G02B 5/0221; G02B 5/0226; G02B 5/0236–5/0247; G02B 5/0257; G02B 5/0268; G02B 5/0278
USPC ................. 359/599, 601, 614; 362/355, 558, 362/255–256; 349/112
See application file for complete search history.

(56) References Cited

U.S. PATENT DOCUMENTS

| | | | | |
|---|---|---|---|---|
| 6,297,908 B1* | 10/2001 | Suga | .................... | G02B 5/0242 349/64 |
| 6,301,418 B1* | 10/2001 | Freier | .................... | G02B 6/001 362/558 |
| 6,424,395 B1* | 7/2002 | Sato | .................... | G02B 5/0236 349/112 |

(Continued)

FOREIGN PATENT DOCUMENTS

| | | |
|---|---|---|
| KR | 10-0779306 B1 | 11/2007 |
| KR | 10-2010-0062203 A | 6/2010 |

(Continued)

OTHER PUBLICATIONS

English Machine Translation of Choi et al., KR 10-2010-0062203.*

*Primary Examiner* — Derek S Chapel
(74) *Attorney, Agent, or Firm* — Lee & Morse P.C.

(57) ABSTRACT

A film for a display device and a method of manufacturing the film, the film including transparent layers; and scattering layers, the transparent layers and scattering layers being alternately arranged with a predetermined cycle, wherein a plurality of patterns are non-periodically formed in an upper surface or a lower surface of the film.

15 Claims, 7 Drawing Sheets

(56) References Cited

U.S. PATENT DOCUMENTS 8,351,119 B2 * 1/2013 Yang .................... G02B 5/0221
359/599
2012/0132897 A1 5/2012 Seki et al.

FOREIGN PATENT DOCUMENTS

| KR | 10-2011-0051616 A | 5/2011 |
| KR | 10-2012-0056822 A | 6/2012 |
| KR | 10-2013-0125565 A | 11/2013 |

* cited by examiner

FILM FOR DISPLAY DEVICE AND MANUFACTURING METHOD THEREOF

CROSS-REFERENCE TO RELATED APPLICATION

Korean Patent Application No. 10-2013-0094906, filed on Aug. 9, 2013, in the Korean Intellectual Property Office, and entitled: "Film For Display Device and Manufacturing Method Thereof," is incorporated by reference herein in its entirety.

BACKGROUND

1. Field

Embodiments relate to a film for a display device and a manufacturing method thereof.

2. Description of the Related Art

Recently, a variety of mobile electronic devices such as mobile phones, navigation systems, digital cameras, electronic books, portable game machines, and various terminals have been used. The mobile electronic devices may include a liquid crystal display (LCD) or an organic light emitting diode (OLED) display applied as a display device.

Among the various display devices, the organic light emitting device may not require a separate light source, thereby making it possible to be implemented as a slim and lightweight display. Furthermore, the organic light emitting display may have high quality characteristics such as lower power consumption, high luminance, and a short response time.

The above information disclosed in this Background section is only for enhancement of understanding of the background of the invention and therefore it may contain information that does not form the prior art that is already known in this country to a person of ordinary skill in the art.

SUMMARY

Embodiments are directed to a film for a display device and a manufacturing method thereof.

The embodiments may be realized by providing a film for a display device, the film including transparent layers; and scattering layers, the transparent layers and scattering layers being alternately arranged with a predetermined cycle, wherein a plurality of patterns are non-periodically formed in an upper surface or a lower surface of the film.

The scattering layers may include scattering particles that scatter incident light.

One pattern of the plurality of patterns may have a different shape from another pattern of the plurality of patterns.

A plane shape of one pattern of the plurality of patterns may be at least one of a circular shape, a quadrangular shape, a triangular shape, or a wave shape.

A pattern of the plurality of patterns may take the form of at least one of a cylindrical shape, a hemispherical shape, or a hexahedral shape.

One pattern of the plurality of patterns may have a size that is different from a size of another pattern of the plurality of patterns.

A size of one pattern of the plurality of patterns may be about 10 nm to about 9 μm.

The film may have a haze of less than 20%.

Interfaces between the transparent layers and the scattering layers may be perpendicular with respect to an upper surface or a lower surface of the film.

One pattern of the plurality of patterns may have a different shape or a different size with respect to another pattern of the plurality of patterns.

Interfaces between the transparent layers and the scattering layers may form an angle of about 2 degrees to about 60 degrees with an upper surface or a lower surface of the film.

One pattern of the plurality of patterns may have a different shape or a different size with respect to another pattern of the plurality of patterns.

The embodiments may be realized by providing a film for a display device, the film including transparent layers; and scattering layers, the transparent layers and scattering layers being alternately arranged with a predetermined cycle, wherein a plurality of patterns are non-periodically formed in an upper surface or a lower surface of the film, and interfaces between the transparent layers and the scattering layers form an angle of about 2 degrees to about 60 degrees with the upper surface or the lower surface of the film.

One pattern of the plurality of patterns may have a different shape or a different size with respect to another pattern of the plurality of patterns.

The embodiments may be realized by providing a method of manufacturing a film for a display device, the method including providing a press machine including an upper plate and a lower plate; disposing a protrusion and depression mold between the upper plate and the lower plate of the press machine, the protrusion and depression mold including a plurality of pattern molds thereon that are non-periodically formed; disposing a film for a display device between the protrusion and depression mold and one of the upper or plate of the press machine, the film including transparent layers and scattering layers that are alternately arranged with a predetermined cycle; and decreasing a distance between the upper plate and the lower plate of the press machine to apply a pressure to the protrusion and depression mold and the film for the display device.

The plurality of pattern molds may be formed in an upper surface of the protrusion and depression mold.

The press machine may apply pressure to the protrusion and depression mold and the film for the display device to form a plurality of patterns in a surface of the film for the display device, the plurality of patterns being non-periodically disposed.

The embodiments may be realized by providing a method of manufacturing a film for a display device, the method including preparing a film for a display device such that the film includes transparent layers and scattering layers that are alternately arranged with a predetermined cycle; and coating a binder including a plurality of beads on an upper or lower surface of the film.

The method may further include forming a plurality of patterns having a non-periodic arrangement on the upper or lower surface of the film according to an arrangement of the beads.

The binder may include an acrylic resin.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
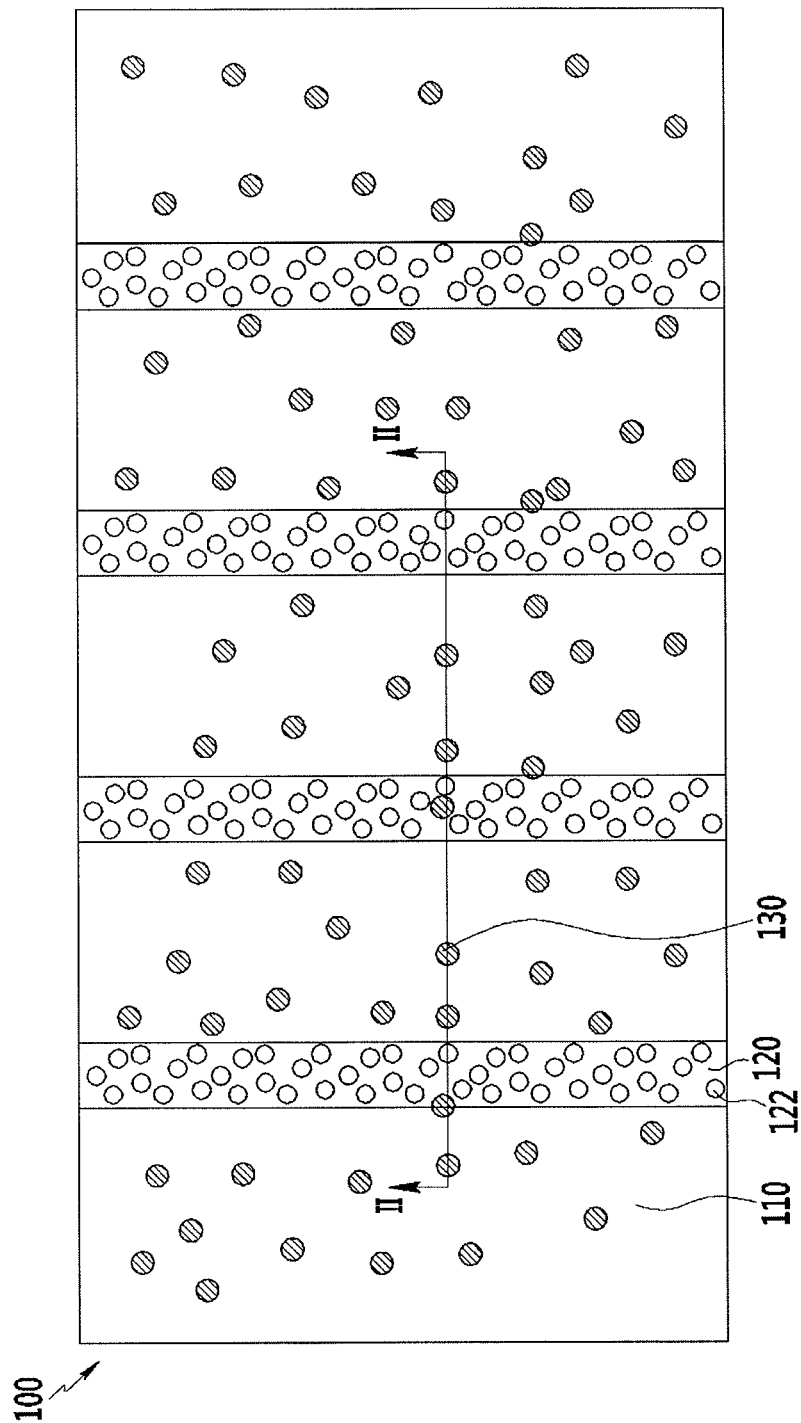
FIG. 1 illustrates a top plan view of a film for a display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

Firstly, a film for a display device according to an exemplary embodiment will be described with reference to FIG. 1 and FIG. 2.

Figure 2:
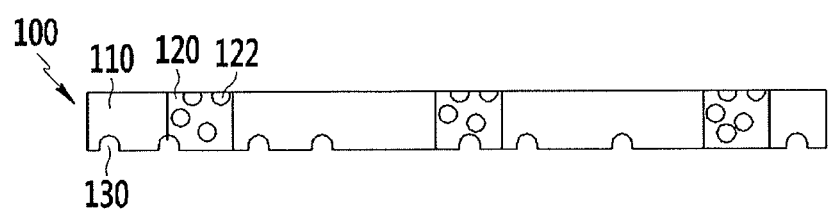
FIG. 2 illustrates a cross-sectional view of the film for a display device according to an exemplary embodiment taken along the line II-II of FIG. 1.

FIG. 1 illustrates a top plan view of a film for a display device according to an exemplary embodiment, and FIG. 2 illustrates a cross-sectional view of the film for a display device according to an exemplary embodiment taken along the line II-II of FIG. 1.

A film 100 for a display device according to an exemplary embodiment may include a transparent layer 110 and a scattering layer 120, e.g., a plurality of transparent layers 110 and scattering layers 120.

The transparent layer 110 may be made of a transparent material such that light incident to the transparent layer 110 may be mostly or completely transmitted therethrough, e.g., from one side to another side.

The scattering layer 120 may include scattering particles 122 that scatter light such that the light incident to the scattering layer 120 may be partially scattered by the scattering particles 122.

The transparent layers 110 and the scattering layers 120 may be alternately arranged, e.g., with a predetermined cycle. For example, one of the scattering layers 120 may be between adjacent pairs of the transparent layers 110. As shown in FIG. 1, on a plane, the transparent layers 110 and the scattering layers 120 may extend lengthwise in a vertical direction. In an implementation, the transparent layers 110 and the scattering layers 120 may extend lengthwise in a horizontal direction and/or may be formed in a lattice structure.

A boundary surface of the transparent layer 110 and the scattering layer 120, e.g., an interface between the transparent layer 110 and the scattering layer 120, may be substantially vertical with respect to an upper surface or a lower surface of the film 100. For example, as shown in FIG. 2, the interface between the transparent layer 110 and the scattering layer 120 may be substantially perpendicular with respect to outer (e.g., upper and lower) surfaces of the film 100.

The transparent layer 110 and the scattering layer 120 may be alternately arranged with the predetermined cycle, and light incident from the lower surface of the film 100 may be anisotropically scattered such that the color shift of the side may be improved without the luminance loss at the front.

A plurality of patterns 130 may be formed at or in the, e.g., lower, surface of the film 100. In an implementation, the plurality of patterns 130 may be formed at or in the, e.g., upper, surface of the film 100. For example, the plurality of patterns 130 may be formed in only one side or surface of the film 100.

The plurality of patterns 130 may be non-periodically disposed. For example, an interval between or an arrangement of the plurality of patterns 130 may be irregular. For example, the plurality of patterns 130 may be non-uniformly or randomly scattered on or in the one surface of the film 100.

In an implementation, each of the patterns 130 may be hemispherical, and a plane or sectional shape (e.g., in plan view) of the patterns 130 may be circular. For example, each pattern 130 may be formed as a hemispherical groove. In an implementation, each pattern 130 may be formed as a groove or as a protrusion.

A size or dimension of the pattern 130 may be about 10 nm to about 9 μm. For example, when the pattern 130 has a hemispherical shape, a diameter of the hemispherical pattern 130 may be about 10 nm to about 9 μm. In an implementation, some of the patterns 130 may be formed at a same interval or at different intervals. In an implementation, the plurality of patterns 130 may be formed at different intervals, and the intervals between the plurality of patterns 130 may be regularly disposed. For example, by providing a plurality of patterns 130 having an irregular selection of sizes and/or providing a plurality of pattern 130 at an irregular interval, the non-periodical, random, or non-uniform arrangement may be realized.

In the film 100, the transparent layer 110 and the scattering layer 120 may be alternately arranged with the predetermined cycle such that interference and the moiré phenomenon could be generated. However, by including the non-periodically disposed plurality of patterns 130 on the upper surface or the lower surface of the film 100 (according to an exemplary embodiment), periodicity of the transparent layer 110 and the scattering layer 120 may be reduced and/or eliminated. Accordingly, the moiré phenomenon may be reduced and/or prevented by the plurality of patterns 130 that are non-periodically disposed.

In an implementation, the plurality of patterns 130 may be formed in a range, a ratio, or a pattern density that helps minimize deterioration of the transmittance of the film 100. Next, the range, ratio, or pattern density that helps minimize the deterioration of the transmittance will be described with reference to Table 1.

TABLE 1

| Size of a pattern: 2 µm | | | Size of a pattern: 0.7 µm | | |
|---|---|---|---|---|---|
| Ratio (%) of a pattern | Haze (%) | Transmittance (%) | Ratio (%) of a pattern | Haze (%) | Transmittance (%) |
| 85.39561 | 86.50729 | 75.43963 | 63.55784 | 92.31319 | 54.2255 |
| 73.41258 | 77.71087 | 82.58578 | 40.48421 | 90.37656 | 70.19564 |
| 64.37872 | 69.39686 | 86.7871 | 31.82033 | 86.74806 | 76.30437 |
| 36.63569 | 39.57112 | 95.22185 | 25.73349 | 81.70134 | 81.13394 |
| 27.35311 | 29.22624 | 96.66361 | 11.58063 | 81.70134 | 81.13394 |
| 21.68439 | 22.88414 | 97.56476 | 7.962863 | 40.81153 | 94.54924 |
| 15.33025 | 15.90457 | 98.15857 | 6.067414 | 32.78378 | 95.90831 |
| | | | 4.110513 | 23.29753 | 97.05983 |

As the ratio or pattern density of the pattern 130 is decreased in the film 100, the haze may also be decreased such that a ratio or amount of the light that is scattered by the pattern 130 may be reduced, and the transmittance may be increased.

In the case that the patterns 130 have the hemisphere shape having the diameter of 2 µm, when the haze (of the film) is about 22.88%, the transmittance (of the film) may be about 97.56%, and when the haze is about 15.90%, the transmittance may be about 98.16%.

Also, in the case that the patterns 130 have the hemisphere shape having the diameter 0.7 µm, when the haze is about 23.30%, the transmittance may be about 97.06%.

For example, in accordance with an experimental result, when the pattern 130 provides a haze of less than 20%, the film 100 may have transmittance more than about 97%, and the transmittance deterioration is small.

The film for the display device according to an exemplary embodiment may be used by being attached to various display devices, e.g., a liquid crystal display or an organic light emitting device.

Next, referring to FIG. 3 and FIG. 4, the film for the display device according to an exemplary embodiment will be described.

Figure 3:
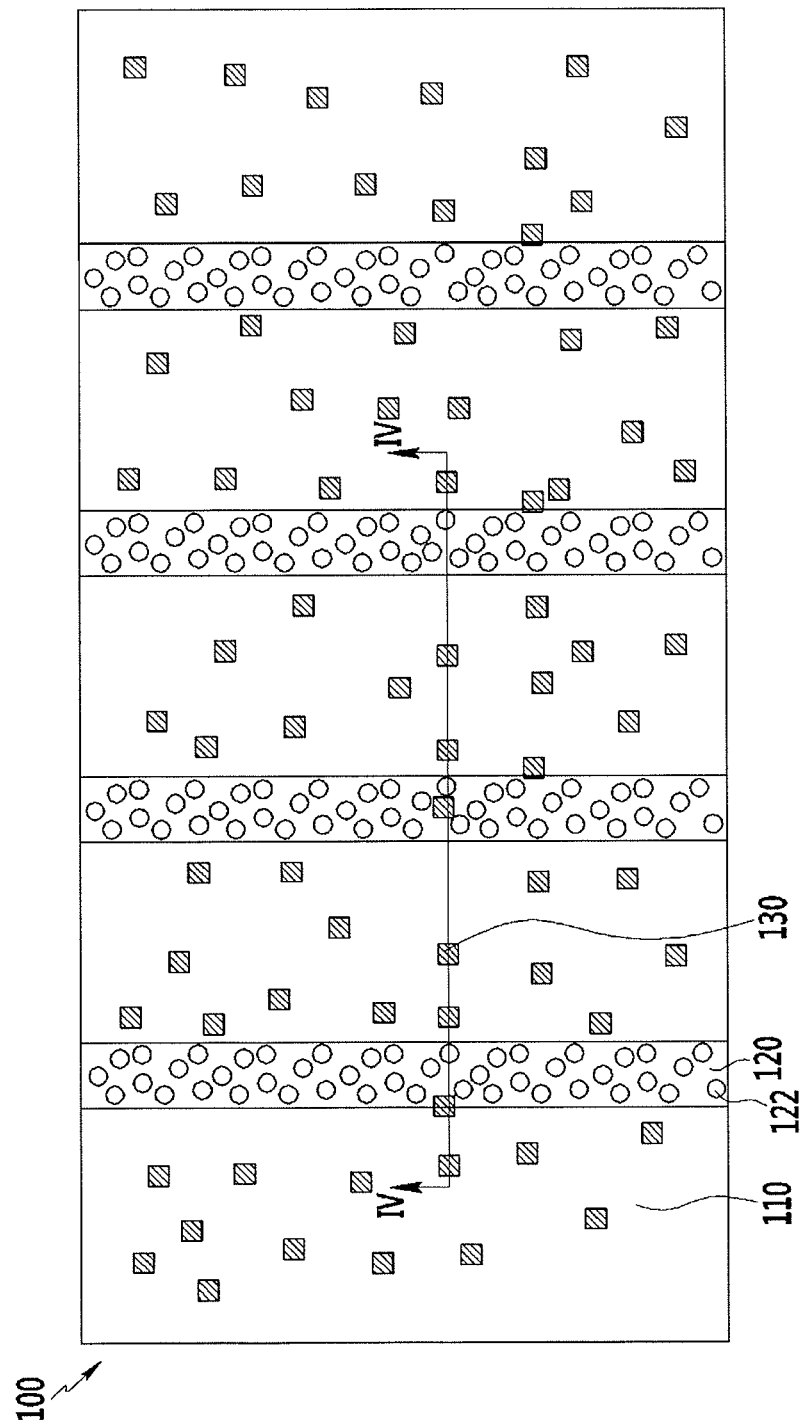
FIG. 3 illustrates a top plan view of a film for a display device according to an exemplary embodiment.
Figure 4:
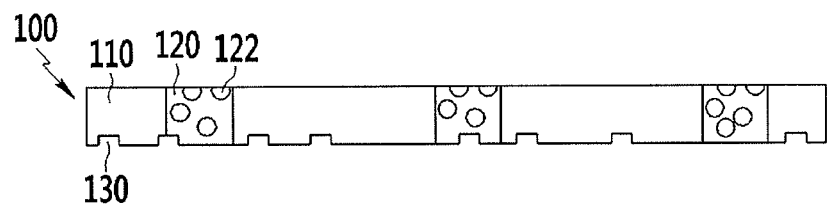
FIG. 4 illustrates a cross-sectional view of the film for a display device according to an exemplary embodiment taken along the line IV-IV of FIG. 3.

The film for the display device according to an exemplary embodiment shown in FIG. 3 and FIG. 4 may be the same as most of the film for the display device according to an exemplary embodiment shown in FIG. 1 and FIG. 2 such that repeated descriptions of like elements thereof may be omitted. The present exemplary embodiment may include a different pattern from the previous exemplary embodiment, and it will now be described in detail.

FIG. 3 illustrates a top plan view of a film of a display device according to an exemplary embodiment, and FIG. 4 illustrates a cross-sectional view of the film for a display device according to an exemplary embodiment taken along the line IV-IV of FIG. 3.

The film 100 for the display device according to an exemplary embodiment may include the transparent layers 110 and the scattering layers 120 that are alternately arranged with the predetermined cycle, and a plurality of patterns 130 may be formed on or in the upper surface or the lower surface of the film 100.

The plurality of patterns 130 may be non-periodically, randomly, or irregularly disposed or arranged. For example, intervals between patterns 130 of the plurality of patterns 130 may be irregular or random.

In an implementation, each pattern 130 may have a hexahedron shape. For example, a plane or sectional shape (in plan view) of the pattern 130 may be a quadrangle. In an implementation, the pattern 130 may be, e.g., formed as a groove having a hexahedron shape and/or may be formed as a protrusion having a hexahedron shape.

In an implementation, the patterns 130 may take the form of any of various shapes. For example, the patterns 130 may have a cylindrical shape, and/or the plane or sectional shape (in plan view) of the pattern 130 may take the form of a triangle or a ripple or wave shape.

In an implementation, the plurality of patterns 130 may all be formed with the same shape. In an implementation, the plurality of patterns 130 may have various different shapes. For example, some patterns 130 among the plurality of patterns 130 may have the hemispherical shape, and others of the patterns 130 may have the hexahedron shape. For example, the shapes of the pattern 130 may be different, thereby realizing the overall non-periodic arrangement.

Next, a manufacturing method of a film for a display device according to an exemplary embodiment will be described with reference to FIG. 5 and FIG. 6.

Figure 5:
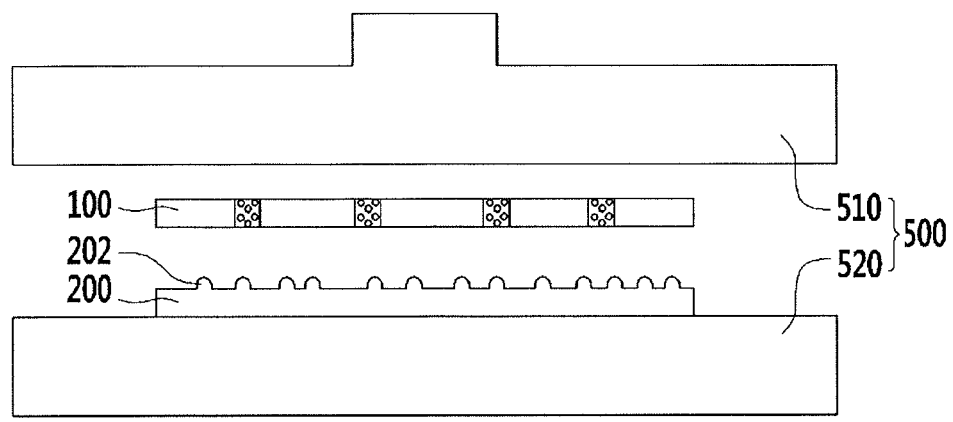
FIG. 5 and FIG. 6 illustrate cross-sectional views showing stages in a manufacturing method of a film for a display device according to an exemplary embodiment.
Figure 6:
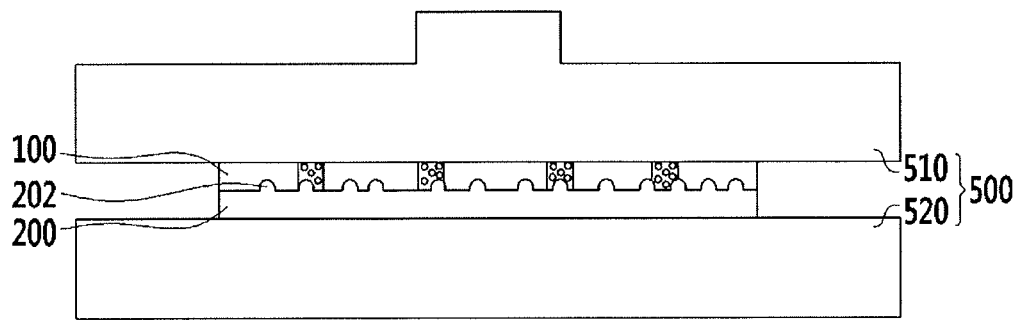

FIG. 5 and FIG. 6 illustrate cross-sectional views of stages in a manufacturing method of a film for a display device according to an exemplary embodiment.

Firstly, as shown in FIG. 5, a press machine 500 (including an upper plate 510 and a lower plate 520) may be provided. Although not shown, a controller that controls a distance between the upper plate 510 and the lower plate 520 of the press machine 500 may be further included.

Next, a protrusion and depression fabric or mold 200 may be disposed between the upper plate 510 and the lower plate 520 of the press machine 500. In an implementation, the protrusion and depression mold 200 may be disposed directly on the upper plate 510.

An outer surface, e.g., an upper surface, of the protrusion and depression mold 200 may include a plurality of pattern molds 202 thereon, and the plurality of pattern molds 202 may be non-periodically disposed. For example, an interval between pattern molds 202 of the plurality of pattern molds 202 may be irregular, and/or a shape or size of pattern molds 202 of the plurality of pattern molds 202 may be different.

Next, the film 100 for the display device may be disposed between, e.g., the protrusion and depression mold 200 and the upper plate 510 of the press machine 500. In an implementation, the film 100 may be disposed directly on the protrusion and depression mold 200, and the lower surface of the film 100 may face the pattern molds 202 of the protrusion and depression mold 200.

The film 100 may include the transparent layers 110 and the scattering layers 120 that are alternately arranged with the predetermined cycle.

As shown in FIG. 6, a distance between the upper plate 510 and the lower plate 520 of the press machine 500 may be decreased to apply pressure to the protrusion and depression mold 200 and the film 100. An impression of the plurality of pattern molds 202 (formed at the upper surface of the protrusion and depression mold 200) may be transferred to the lower surface of the film 100 by the pressure. For example, the plurality of pattern molds 202 of the protrusion and depression mold 200 may form a complementary imprint in the film 100. Accordingly, a plurality of patterns 130 may be non-periodically formed in the lower surface of the film 100.

In the present exemplary embodiment, the manufacturing method of the film for the display device shown in FIG. 1 and FIG. 2 was described. In an implementation, the shape of the plurality of pattern molds 202 of the protrusion and depression mold 200 may be changed as desired, e.g., to manufacture the film for the display device shown in FIG. 3 and FIG. 4. In an implementation, the size, the interval, and/or the shape of the plurality of pattern molds 202 of the protrusion and depression mold 200 may be variously changed such that a plurality of patterns 130 may be non-periodically formed in the lower surface of the film 100.

Next, a manufacturing method of a film for a display device according to an exemplary embodiment will be described with reference to FIG. 7.

Figure 7:
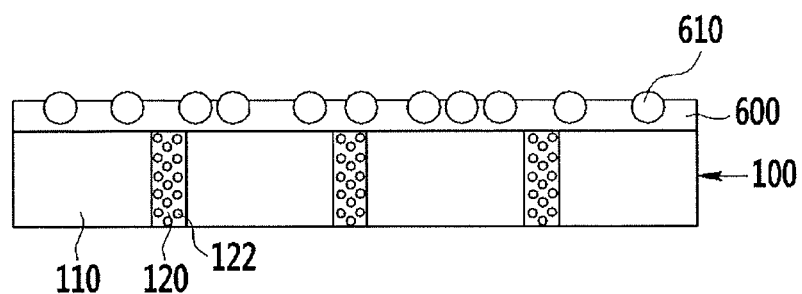
FIG. 7 illustrates a cross-sectional view of a stage in a manufacturing method of a film for a display device according to an exemplary embodiment.

FIG. 7 illustrates a cross-sectional view of a stage in a manufacturing method of a film for a display device according to an exemplary embodiment.

Firstly, the film 100 for the display device may be prepared. The film 100 for the display device may include the transparent layers 110 and the scattering layers 120 that are alternately arranged with the predetermined cycle.

Next, a binder 600 (including a plurality of beads 610) may be coated on an outer surface, e.g., the upper surface, of the film 100. The binder 600 may be made of or may include a liquid, and the beads 610 may be made of or may include a solid. For example, the binder 600 may be made of or may include an acrylic resin. Accordingly, by mixing the beads 610 in the binder 600 and performing a hardening or curing process after coating on the film 100, the beads 610 may be non-periodically disposed on the film 100. For example, due to the irregular nature of diffusion or dispersion of the, e.g., solid, beads 610 in the, e.g., liquid, binder 600, the beads 610 may be irregularly and/or non-uniformly dispersed on the film 100.

By non-periodically disposing or dispersing the beads 610, a plurality of patterns may be non-periodically formed on the upper surface of the film 100. A shape of the plurality of patterns may be determined according to a shape of the beads 610. In an implementation, a shape of the beads 610 may be spherical, and thus the pattern may be formed to be hemispherical. In an implementation, the beads 610 may be formed of various shapes such as a hexahedron shape. In an implementation, the beads 610 may remain on the film 100 to form the pattern, or the beads 610 may be removed after curing the binder 600 such that recesses left by the removed beads 610 may form the pattern. For example, the beads 610 may themselves for the patterns 130 and/or the beads 610 may serve as a template for forming the patterns 130 by being removed after the hardening or curing of the binder 600.

In an implementation, the plurality of beads 610 may have a constant or uniform size, or the plurality of beads 610 may have different or non-uniform sizes.

Next, referring to FIG. 8, the film for the display device according to an exemplary embodiment will be described.

Figure 8:
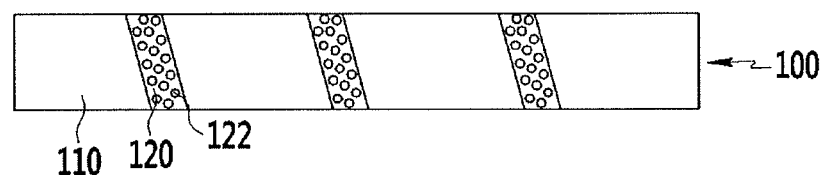
FIG. 8 illustrates a cross-sectional view of a film for a display device according to an exemplary embodiment.

FIG. 8 illustrates a cross-sectional view of a film for a display device according to an exemplary embodiment.

The film 100 for the display device according to an exemplary embodiment may include the transparent layers 110 and the scattering layers 120. The transparent layers 110 and the scattering layers 120 may be alternately arranged with the predetermined cycle.

The boundary surface of or interface between the transparent layers 110 and the scattering layers 120 may be inclined by a predetermined angle with respect to the upper surface or the lower surface of the film 100. The angle of the boundary surface of or interface between the transparent layers 110 and the scattering layers 120 (with regard to the upper surface or the lower surface of the film 100) may be about 2 degrees to about 60 degrees.

Accordingly, referring to the cross-section of the film 100, the transparent layers 110 and the scattering layers 120 may overlap each other in the vertical direction. In the present exemplary embodiment, although the transparent layers 110 and the scattering layers 120 are alternately arranged with the predetermined angle, a repetition cycle of the transparent layers 110 and a repetition cycle of the scattering layers 120 may be overlapped with each other such that an extinction effect may appear. Accordingly, the moiré phenomenon may not be generated.

Next, referring to FIG. 9, the film for the display device according to an exemplary embodiment will be described.

Figure 9:
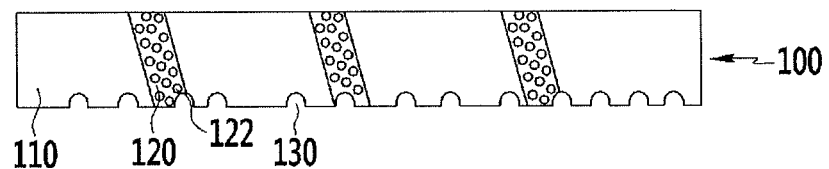
FIG. 9 illustrates a cross-sectional view of a film for a display device according to an exemplary embodiment.

The film for the display device according to an exemplary embodiment shown in FIG. 9 may be mostly the same as most of the film for the display device according to the exemplary embodiment shown in FIG. 8 such that repeated descriptions of like elements thereof may be omitted. In the present exemplary embodiment, a plurality of patterns may be non-periodically formed in the film, differently from the previous exemplary embodiment, and this will now be described.

FIG. 9 illustrates a cross-sectional view of a film for a display device according to an exemplary embodiment.

The film 100 for the display device according to an exemplary embodiment may include the transparent layers 110 and the scattering layers 120 that are alternately arranged with the predetermined cycle. The boundary surface of or interface between the transparent layers 110 and the scattering layers 120 may be inclined by an angle of about 2 degrees to about 60 degrees with regard to the outer surfaces, e.g., the upper surface and/or the lower surface, of the film 100.

A plurality of patterns 130 may be formed in one surface, e.g., the upper surface or the lower surface, of the film 100, and the plurality of patterns 130 may be non-periodically disposed. At least one of the size, the interval, or the shape of some patterns 130 of the plurality of patterns 130 may be differently formed.

By way of summation and review, an organic light emitting device may cause a phenomenon in which a color characteristic is changed when viewing from the side. For example, although white light may be realized or observed at the front of the organic light emitting device, a color that is changed into an arbitrary color may be realized or observed in the white when viewing at the side, and this is referred as a color shift phenomenon.

A film may be attached to a surface of the organic light emitting device in order to help compensate for the color shift phenomenon. Using a film for the display device may result luminance loss or a moiré phenomenon.

The embodiments may provide a film for a display device that helps improve a color shift and simultaneously helps prevent a moiré phenomenon without a front luminance loss.

Example embodiments have been disclosed herein, and although specific terms are employed, they are used and are to be interpreted in a generic and descriptive sense only and

| <Description of Symbols> | |
|---|---|
| 100: film | 110: transparent layer |
| 120: scattering layer | 122: scattering particle |
| 130: pattern | |
| 200: protrusions and depressions fabric | |
| 202: protrusions and depressions fabric pattern | |
| 500: press machine | 510: upper plate |
| 520: lower plate | 600: binder |
| 610: bead | |

What is claimed is:

1. A film for a display device, the film comprising:
    transparent layers; and
    scattering layers, the transparent layers and scattering layers being alternately arranged with a predetermined cycle,
    wherein a plurality of patterns are non-periodically and discontinuously formed in an outer surface of the film including outer surfaces of the transparent layers and outer surfaces of the scattering layers, the outer surfaces of the transparent layers and the outer surfaces of the scattering layers being coplanar, and
    wherein the plurality of patterns include a plurality of grooves extending inwardly from the outer surfaces of the transparent layers and the outer surfaces of the scattering layers.

2. The film for the display device as claimed in claim 1, wherein the scattering layers include scattering particles that scatter incident light.

3. The film for the display device as claimed in claim 1, wherein one pattern of the plurality of patterns has a different shape from another pattern of the plurality of patterns.

4. The film for the display device as claimed in claim 1, wherein a plane shape of one pattern of the plurality of patterns is at least one of a circular shape, a quadrangular shape, a triangular shape, or a wave shape.

5. The film for the display device as claimed in claim 1, wherein a pattern of the plurality of patterns takes the form of at least one of a cylindrical shape, a hemispherical shape, or a hexahedral shape.

6. The film for the display device as claimed in claim 1, wherein one pattern of the plurality of patterns has a size that is different from a size of another pattern of the plurality of patterns.

7. The film for the display device as claimed in claim 1, wherein a size of one pattern of the plurality of patterns is about 10 nm to about 9 μm.

8. The film for the display device as claimed in claim 1, wherein the film has a haze of less than 20%.

9. The film for the display device as claimed in claim 1, wherein interfaces between the transparent layers and the scattering layers are perpendicular with respect to an upper surface or a lower surface of the film.

10. The film for the display device as claimed in claim 9, wherein one pattern of the plurality of patterns has a different shape or a different size with respect to another pattern of the plurality of patterns.

11. The film for the display device as claimed in claim 1, wherein interfaces between the transparent layers and the scattering layers form an angle of about 2 degrees to about 60 degrees with an upper surface or a lower surface of the film.

12. The film for the display device as claimed in claim 11, wherein one pattern of the plurality of patterns has a different shape or a different size with respect to another pattern of the plurality of patterns.

13. A method of manufacturing a film for a display device, the method comprising:
    providing a press machine including an upper plate and a lower plate;
    disposing a protrusion and depression mold between the upper plate and the lower plate of the press machine, the protrusion and depression mold including a plurality of pattern molds thereon that are non-periodically and discontinuously formed;
    disposing a film for a display device between the protrusion and depression mold and one of the upper or plate of the press machine, the film including transparent layers and scattering layers that are alternately arranged with a predetermined cycle; and
    decreasing a distance between the upper plate and the lower plate of the press machine to apply a pressure to the protrusion and depression mold and the film for the display device and form a plurality of patterns that include a plurality of grooves extending inwardly from an outer surface of the film including outer surfaces of the transparent layers and outer surfaces of the scattering layers, the outer surfaces of the transparent layers and the outer surfaces of the scattering layers being coplanar.

14. The method as claimed in claim 13, wherein the plurality of pattern molds are formed in an upper surface of the protrusion and depression mold.

15. The method as claimed in claim 14, wherein the press machine applies pressure to the protrusion and depression mold and the film for the display device to form the plurality of patterns in a surface of the film for the display device, the plurality of patterns being non-periodically and discontinuously disposed.

* * * * *